(12) United States Patent
Damnjanovic et al.

(10) Patent No.: US 9,634,806 B2
(45) Date of Patent: Apr. 25, 2017

(54) DATA PRIORITIZATION FOR A POWER-LIMITED UE IN A WIRELESS COMMUNICATION SYSTEM

(75) Inventors: Jelena M. Damnjanovic, Del Mar, CA (US); Wanshi Chen, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 12/813,409

(22) Filed: Jun. 10, 2010

(65) Prior Publication Data

US 2011/0141959 A1 Jun. 16, 2011

Related U.S. Application Data

(60) Provisional application No. 61/186,326, filed on Jun. 11, 2009.

(51) Int. Cl.
*H04L 1/18* (2006.01)
*H04W 52/34* (2009.01)
(Continued)

(52) U.S. Cl.
CPC .......... *H04L 1/1887* (2013.01); *H04L 1/1854* (2013.01); *H04W 52/346* (2013.01);
(Continued)

(58) Field of Classification Search
CPC ............. H04W 52/346; H04W 52/265; H04W 52/343; H04W 52/34; H04W 52/42;
(Continued)

(56) References Cited

U.S. PATENT DOCUMENTS

2002/0097675 A1* 7/2002 Fowler et al. ............... 370/230
2005/0135312 A1* 6/2005 Montojo et al. ............. 370/335
(Continued)

FOREIGN PATENT DOCUMENTS

CN 101090303 A 12/2007
EP 1892983 A1 2/2008
(Continued)

OTHER PUBLICATIONS

Ericsson: "E-TFC selection for DC-HSUPA", 3GPP Draft; R2-092942, E-TFC_Selection_for_DC-HSUPA, 3rd, Generation Partnership Project (3GPP), Mobile Competence Centre; 650, Route Des Lucioles; F-06921 Sophia-Antipolis Cedex; France, no. San Francisco, USA; Apr. 28, 2009, Apr. 28, 2009 (Apr. 28, 2009), XP050340739 [retrieved on Apr. 28, 2009] section 2.1.2 section 2.2.1.
(Continued)

*Primary Examiner* — Kan Yuen
*Assistant Examiner* — Richard Chang
(74) *Attorney, Agent, or Firm* — Paul Kuo

(57) ABSTRACT

Techniques for transmitting data by a power-limited user equipment (UE) in a wireless communication system are described. The UE may transmit data of different types on one or more carriers and may be power limited. In some aspects, the UE may prioritize the data to transmit based on the priorities of the different data types, the priorities of carriers on which the data is transmitted, and/or other criteria. In one design, the UE may obtain data to transmit on at least one carrier for the uplink. The UE may determine that it is power limited for transmission on the at least one carrier. The UE may prioritize the data to transmit based on at least one criterion. The UE may allocate its available transmit power to the prioritized data and may transmit the prioritized data at the allocated transmit power.

53 Claims, 10 Drawing Sheets

(51) Int. Cl.
  *H04L 1/00* (2006.01)
  *H04W 52/26* (2009.01)
  *H04W 52/42* (2009.01)
  *H04W 72/10* (2009.01)
(52) U.S. Cl.
  CPC ... *H04L 2001/0098* (2013.01); *H04W 52/265* (2013.01); *H04W 52/42* (2013.01); *H04W 72/10* (2013.01)
(58) Field of Classification Search
  CPC .... H04W 72/10; H04L 1/1854; H04L 1/1887; H04L 2001/0098
  USPC .................. 370/310, 329, 311; 455/450, 522
  See application file for complete search history.

(56) References Cited

U.S. PATENT DOCUMENTS

| | | | |
|---|---|---|---|
| 2005/0208960 A1* | 9/2005 | Hassan | H04W 52/346 455/522 |
| 2005/0281219 A1* | 12/2005 | Kim et al. | 370/328 |
| 2006/0111119 A1 | 5/2006 | Iochi | |
| 2006/0236190 A1 | 10/2006 | Vinh et al. | |
| 2007/0097927 A1* | 5/2007 | Gorokhov et al. | 370/335 |
| 2007/0149229 A1* | 6/2007 | Frederiksen et al. | 455/512 |
| 2007/0184863 A1* | 8/2007 | Takagi | H04W 52/346 455/507 |
| 2007/0274209 A1 | 11/2007 | Aarnio et al. | |
| 2008/0057894 A1 | 3/2008 | Aleksic et al. | |
| 2008/0233992 A1 | 9/2008 | Oteri et al. | |

FOREIGN PATENT DOCUMENTS

| | | |
|---|---|---|
| JP | 2005064872 A | 3/2005 |
| JP | 2007520178 A | 7/2007 |
| WO | 2008155469 A1 | 12/2008 |

OTHER PUBLICATIONS

Ericsson: "EUL coverage enhancements" 7,11,30, 3GPP Draft; R2-081779, 3rd Generation 35,41,47 Partnership Project (3GPP), Mobile Competence Centre; 650, Route Des Lucioles; F-06921 Sophia-Antipolis Cedex; France, vol. RAN WG2, no. Shenzhen, China; Mar. 26, 2008, Mar. 26, 2008 (Mar. 26, 2008), XP050139485 [retrieved on Mar. 26, 2008] section 2.2.
International Search Report and Written Opinion—PCT/US2010/038410, International Search Authority—European Patent Office—Oct. 5, 2010.
LG Electronics: "Uplink multiple channel, transmission under UE transmit power, limitation", 3GPP Draft; RI-091206 LTEA UL TXP Limitation, 3rd Generation Partnership Project (3GPP), Mobile Competence Centre; 650, Route Des Lucioles; F-06921 Sophia-Antipolis Cedex; France, no. Seoul, Korea; Mar. 17, 2009, Mar. 17, 2009 (Mar. 17, 2009), XP050338821 [retrieved on Mar. 17, 2009] section 3.
Qualcomm Incorporated: "UL Power Control for Multicarrier Operation" 3GPP Draft; RI-100677 UL Power Control for MC, 3rd Generation Partnership Project (3GPP), Mobile Competence Centre; 650, Route Des Lucioles; F-06921 Sophia-Antipolis Cedex; France, vol. RAN WG1, no. Valencia, Spain; Jan. 18, 2010, Jan. 12, 2010 (Jan. 12, 2010), XP050418270 [retrieved on Jan. 12, 2010] the whole document.
Ericsson: "HARQ Operation in case of UL Power Limitation", 3GPP TSG-RAN WG2 #59bis, R2-074061, Shanghai, China, Oct. 8-12, 2007.
Ericsson: "UE Transmission Power Headroom Report for LTE", 3GPP TSG-RAN WG2 #59bis, R2-074049, Shanghai, China, Oct. 8-12, 2007.
Taiwan Search Report—TW099119165—TIPO—Aug. 29, 2013.
Taiwan Search Report—TW099119165—TIPO—Dec. 25, 2013.

\* cited by examiner

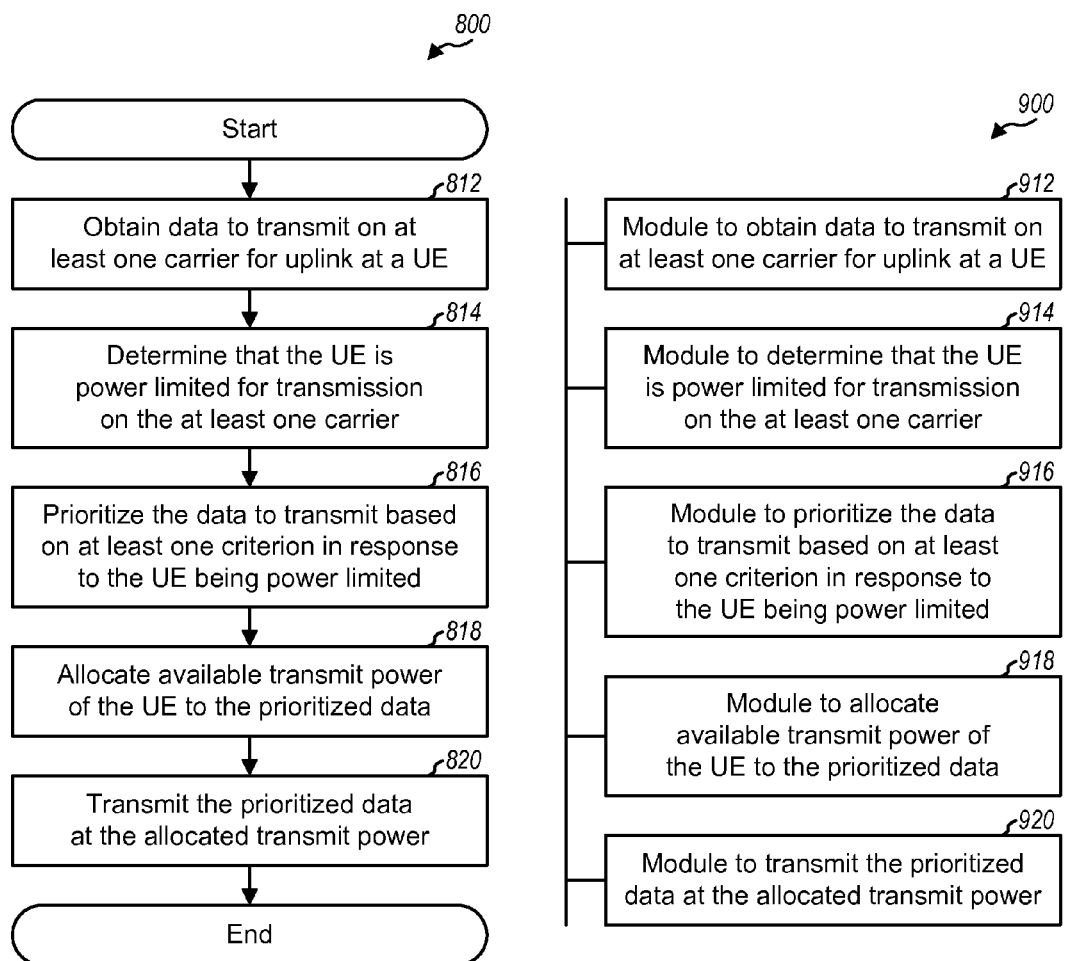

DATA PRIORITIZATION FOR A POWER-LIMITED UE IN A WIRELESS COMMUNICATION SYSTEM

The present application claims priority to provisional U.S. Application Ser. No. 61/186,326, entitled "Power Control and Channel Prioritization for Power Limited Users," filed Jun. 11, 2009, assigned to the assignee hereof and incorporated herein by reference.

BACKGROUND

I. Field

The present disclosure relates generally to communication, and more specifically to techniques for transmitting data in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A UE may be located far away from a serving base station, which is a base station designated to serve the UE on the downlink and/or uplink. The UE may have a limited amount of transmit power and may have a large pathloss to the serving base station. It may be desirable to transmit data in an efficient manner in such a scenario.

SUMMARY

Techniques for transmitting data by a power-limited UE in a wireless communication system are described herein. The UE may transmit data of different types on one or more carriers. The UE may be power limited if the required transmit power for all of the data exceeds the available transmit power of the UE. In an aspect, the UE may prioritize the data to transmit based on priorities of different data types and/or other criteria. In another aspect, the UE may prioritize the data to transmit based on priorities of carriers on which the data is transmitted. In yet another aspect, the UE may prioritize the data to transmit based on both the priorities of different data types and the priorities of the carriers.

In one design, the UE may obtain data to transmit on at least one carrier for the uplink. The UE may determine that it is power limited for transmission on the at least one carrier. The UE may prioritize the data to transmit based on at least one criterion, as described below. The UE may allocate its available transmit power to the prioritized data, as also described below. The UE may then transmit the prioritized data at the allocated transmit power.

Various aspects and features of the disclosure are described in further detail below.

BRIEF DESCRIPTION OF THE DRAWINGS

FIG. 8 shows a process for transmitting data in a wireless system.

FIG. 9 shows an apparatus for transmitting data in a wireless system.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
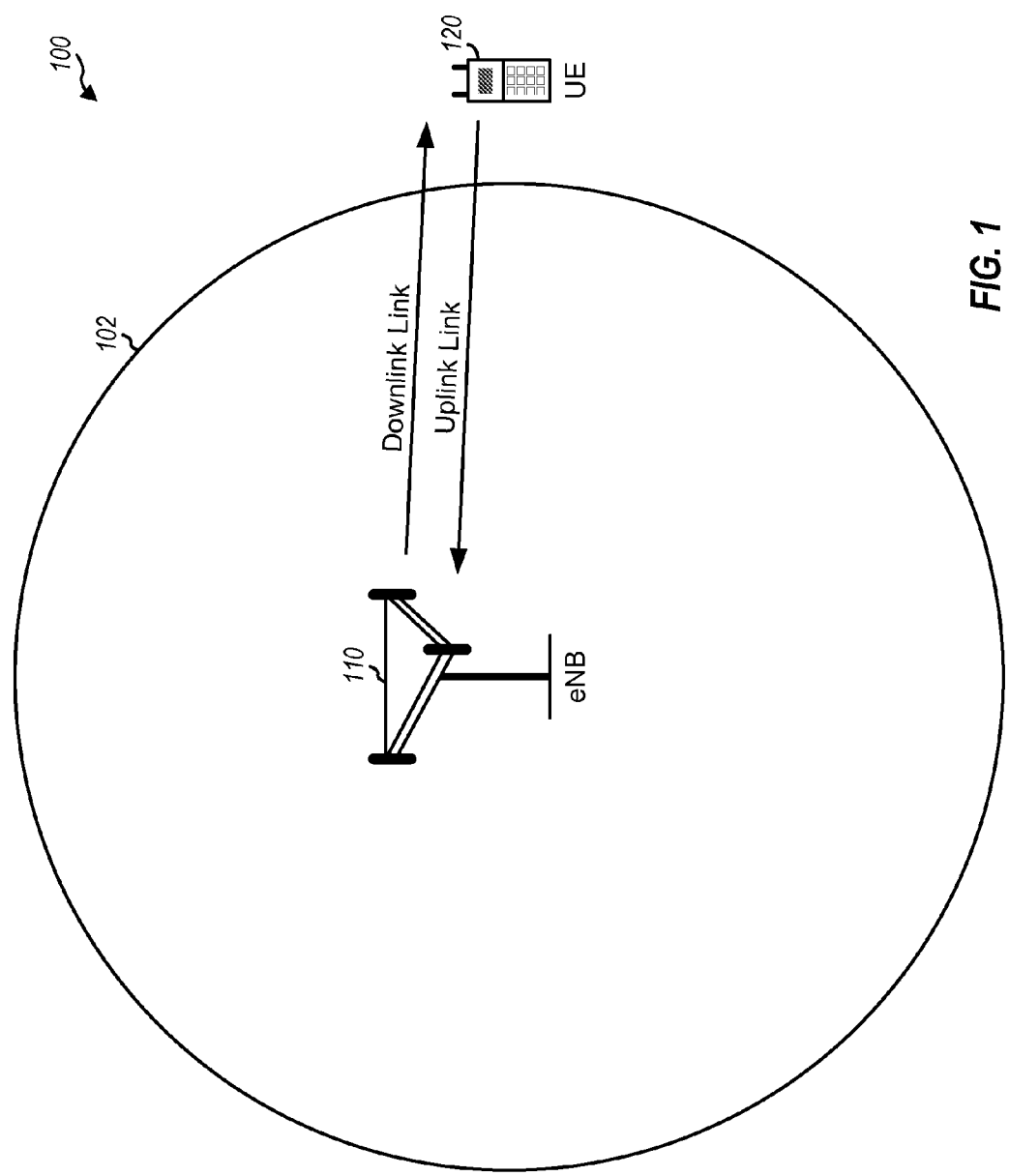
FIG. 1 shows a wireless communication system.

FIG. 1 shows a wireless communication system 100, which may be an LTE system or some other system. System 100 may include a number of evolved Node Bs (eNBs) and other network entities. For simplicity, only one eNB 110 is shown in FIG. 1. An eNB may be an entity that communicates with the UEs and may also be referred to as a Node B, a base station, an access point, etc. An eNB may provide communication coverage for a particular geographic area 102 and may support communication for UEs located within the coverage area. To improve system capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

A number of UEs may be dispersed throughout the system, and each UE may be stationary or mobile. For simplicity, only one UE 120 is shown in FIG. 1. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
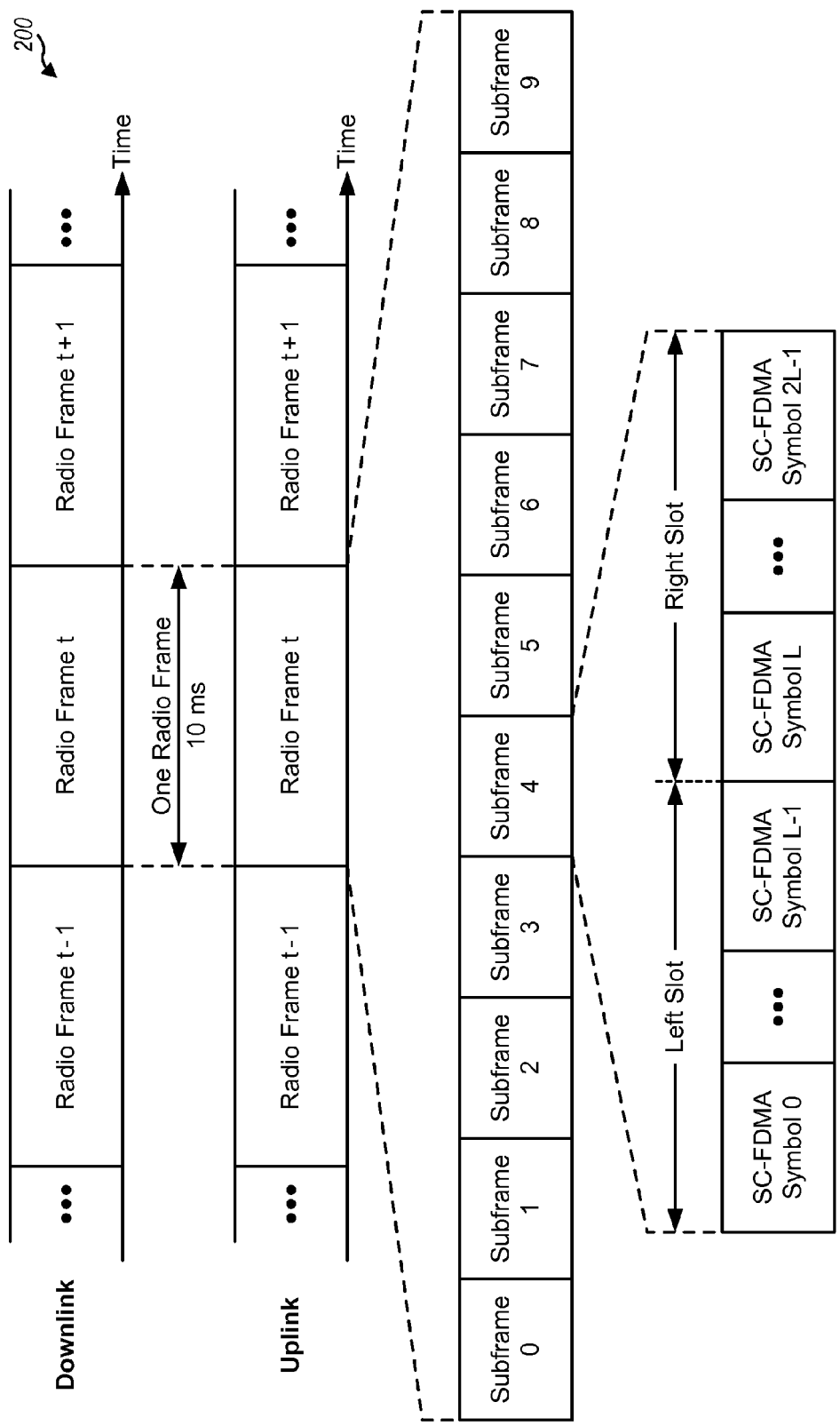
FIG. 2 shows an exemplary frame structure.

FIG. 2 shows an exemplary frame structure 200 for frequency division multiplexing (FDD) in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are transmitted in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively. On the uplink, 2L SC-FDMA symbols may be transmitted in symbol periods 0 through 2L−1 of each subframe, as in FIG. 2. On the downlink, 2L OFDM symbols may be transmitted in symbol periods 0 through 2L−1 of each subframe (not shown in FIG. 2).

Figure 3:
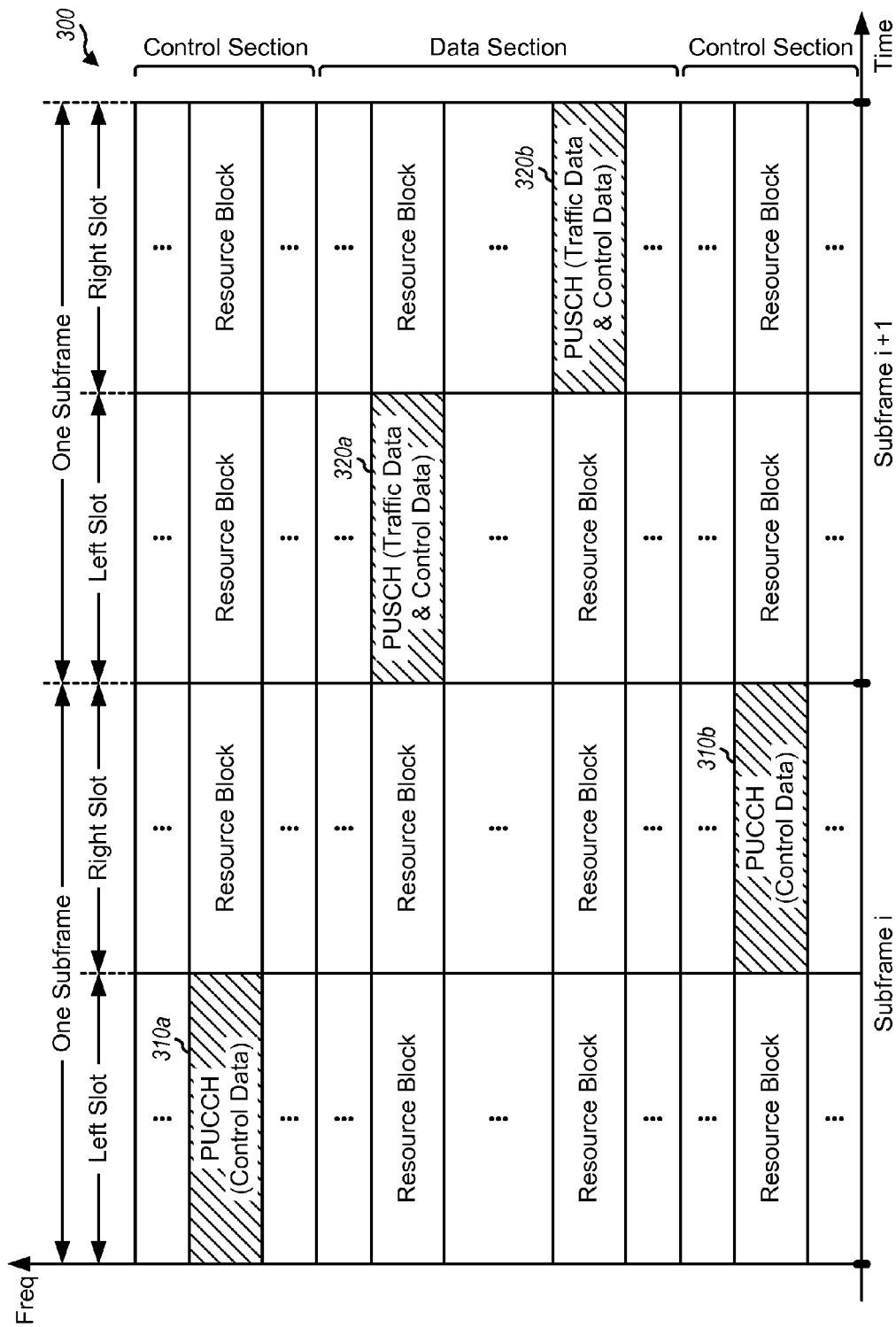
FIG. 3 shows an exemplary transmission structure for the uplink.

FIG. 3 shows an exemplary transmission structure 300 for the uplink in LTE. A number of resource blocks may be defined in each slot with the $N_{FFT}$ total subcarriers for the uplink. Each resource block may cover 12 subcarriers in one slot. The available resource blocks for the uplink may be partitioned into a data section and a control section. The control section may be formed at the two edges of the system bandwidth and may have a configurable size. The data section may include all resource blocks not included in the control section.

UE 120 may be assigned resource blocks in the control section to transmit control data to eNB 110. Control data may also be referred to as control information, uplink control information (UCI), signaling, etc. UE 120 may also be assigned resource blocks in the data section to transmit traffic data to eNB 110. Traffic data may also be referred to as user data, packet data, etc. UE 120 may transmit only control data on a Physical Uplink Control Channel (PUCCH) using assigned resource blocks 310*a* and 310*b* in the control section. UE 120 may transmit only traffic data or both traffic data and control data on a Physical Uplink Shared Channel (PUSCH) using assigned resource blocks 320*a* and 320*b* in the data section. An uplink transmission may span both slots of a subframe and may hop across frequency, as shown in FIG. 3.

The system may support operation on one or multiple carriers for the downlink and one or multiple carriers for the uplink. A carrier may refer to a range of frequencies used for communication and may be associated with certain characteristics. For example, a carrier may be associated with system information describing operation on the carrier, etc. A carrier may also be referred to as a channel, a frequency channel, etc. A carrier for the downlink may be referred to as a downlink carrier, and a carrier for the uplink may be referred to as an uplink carrier.

The system may support hybrid automatic retransmission (HARQ) in order to improve reliability of data transmission. For HARQ on the downlink, eNB 110 may send a transmission of a transport block (or packet) to UE 120 and may send one or more additional transmissions, if needed, until the transport block is decoded correctly by UE 120, or the maximum number of transmissions has been sent, or some other termination condition is encountered. After each transmission of the transport block, UE 120 may decode the transport block based on all received transmissions and may return an acknowledgement (ACK) if the transport block is decoded correctly or a negative acknowledgement (NACK) if the transport block is decoded in error. eNB 110 may send another transmission of the transport block if a NACK is received and may terminate transmission of the transport block if an ACK is received. The ACK/NACK transmitted by UE 120 may also be referred to as HARQ feedback.

To support HARQ on the downlink, UE 120 may evaluate a wireless channel from eNB 110 to UE 120 and may determine and report a channel quality indicator (CQI) indicative of received signal quality at UE 120. eNB 110 may select a modulation and coding scheme (MCS) based on the CQI from UE 120 and may send one or more transmissions of a transport block based on the selected MCS.

The system may support multiple-input multiple-output (MIMO) transmission to achieve higher data rate and/or greater reliability. For MIMO transmission on the downlink, eNB 110 may transmit one or more transport blocks (or codewords) simultaneously via multiple transmit antennas at eNB 110 to multiple receive antennas at UE 120. In general, eNB 110 may transmit Q transport blocks on Q layers formed with a precoding matrix, where Q may be equal to 1, 2, etc. The precoding matrix may be selected by UE 120 and reported to eNB 120 in some MIMO modes and may be selected by eNB 110 in some other MIMO modes.

To support MIMO transmission on the downlink, UE 120 may evaluate a MIMO channel from eNB 110 to UE 120 and may determine (i) up to Q CQIs that indicate the received signal qualities of the Q layers, (ii) a rank indicator (RI) that indicates how many transport blocks to transmit (i.e., the value of Q), and/or (iii) a precoding matrix indicator (PMI) that indicates a precoding matrix to use by eNB 110 to precode data prior to transmission. RI may change more slowly than CQI and PMI. UE 120 may determine and report up to Q CQIs for the Q layers, an RI, and a PMI for each downlink carrier on which traffic data may be transmitted to UE 120.

Figure 4:
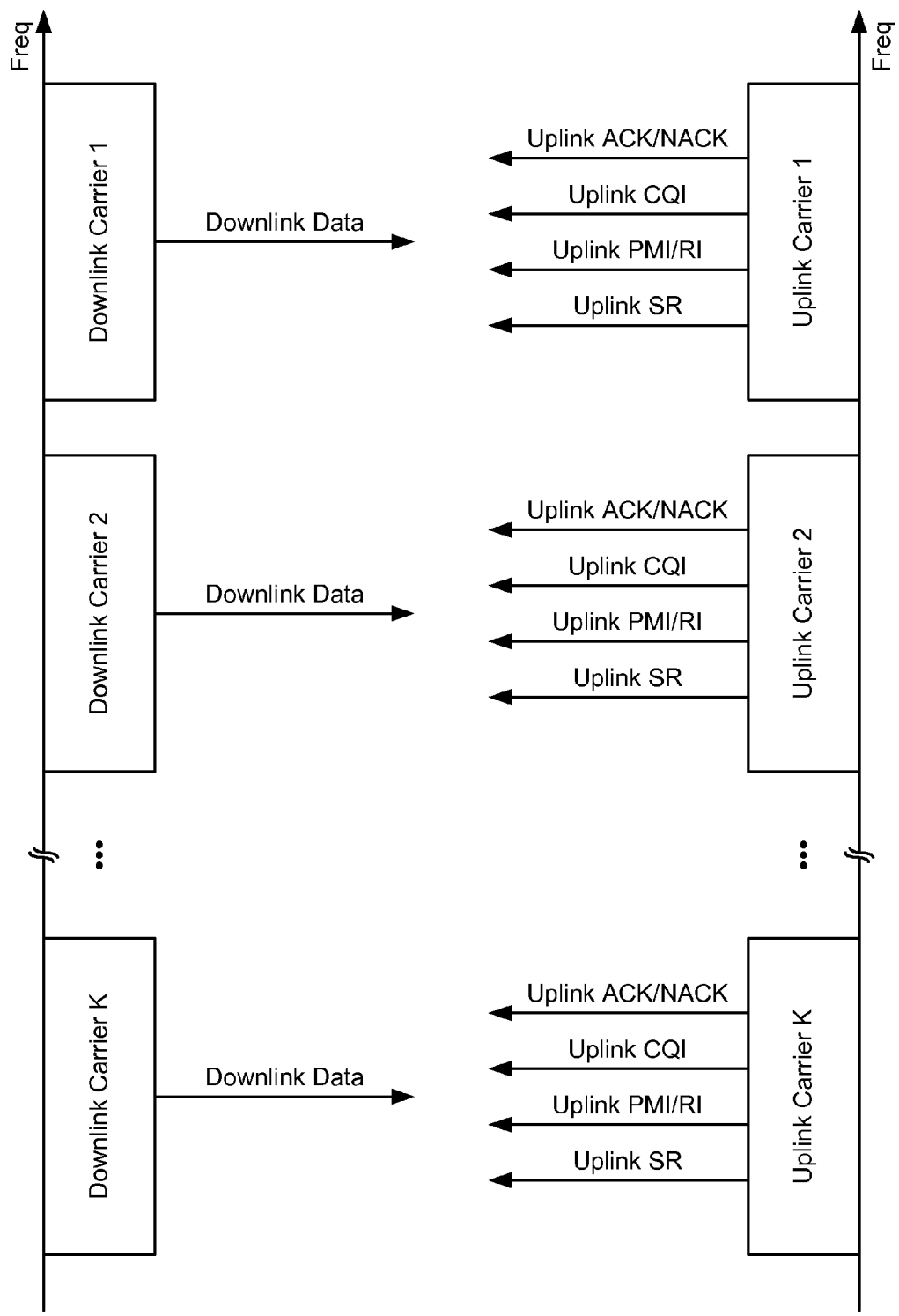
FIG. 4 shows downlink and uplink transmissions on multiple carriers.

FIG. 4 shows a design of data transmission on the downlink and feedback transmission on the uplink with one-to-one downlink-uplink mapping. In this design, K downlink carriers and K uplink carriers are available, and each downlink carrier is paired with a corresponding uplink carrier. eNB 110 may transmit traffic data on a Physical Downlink Shared Channel (PDSCH) on downlink carrier k to UE 120, where k ∈ {1, . . . , K}. UE 120 may transmit control data on the PUCCH or PUSCH on corresponding uplink carrier k to eNB 110. The control data may comprise ACK/NACK for the data transmission on downlink carrier k, up to Q CQIs for Q layers on downlink carrier k, a PMI, an RI, a scheduling request (SR), and/or control data of other types. The scheduling request may ask for resources to enable UE 120 to transmit traffic data on the uplink. UE 120 may also transmit traffic data with the control data on uplink carrier k.

In general, eNB 110 may transmit traffic data on up to K downlink carriers 1 through K to UE 120. UE 120 may receive and decode the data transmission on each downlink carrier and may transmit control data and possibly traffic data on the corresponding uplink carrier. For the one-to-one downlink-uplink mapping shown in FIG. 4, feedback/control data (e.g., CQI, PMI and RI) for each downlink carrier may be transmitted on the corresponding uplink carrier. The uplink carrier used for control data may be paired with (i) the downlink carrier on which traffic data is transmitted (as shown in FIG. 4) or (ii) the downlink carrier on which a downlink grant is transmitted. Other downlink-uplink mappings may also be used. In general, control data (e.g., CQI, PMI and RI) for a given downlink carrier may be transmitted on a designated uplink carrier. The designated uplink carrier may be (i) determined based on the downlink carrier used to transmit traffic data or a downlink grant, e.g., for one-to-one downlink-uplink mapping, or (ii) the same for multiple downlink carriers, e.g., for many-to-one downlink-uplink mapping.

In general, UE 120 may transmit data on one or more uplink carriers in any given subframe. Furthermore, UE 120 may transmit traffic data and/or control data on each uplink carrier. UE 120 may transmit CQI, PMI, RI, SR and/or control data of other types on each uplink carrier.

UE 120 may be power limited for transmission on the uplink. A power-limited scenario is a scenario in which the required transmit power for an uplink transmission exceeds an available transmit power of a UE. A power-limited scenario may occur due to various reasons. For example, UE 120 may be located far away from eNB 110, and the pathloss between UE 120 to eNB 110 may be large. Consequently, UE 120 may need to transmit at a high power level in order to achieve a target received signal quality at eNB 110 in the presence of the large pathloss. UE 120 may also transmit on multiple uplink carriers, and the total required transmit power for all uplink carriers may exceed the available transmit power.

In an aspect, UE 120 may prioritize different types of data to transmit when it is power limited. UE 120 may then transmit some or all of the prioritized data. This may enable UE 120 to transmit higher priority data when it is power limited.

Different types of data may be prioritized in various manners. In one design, different types of data may be prioritized as shown in Table 1. In this design, upper layer signaling may be used to configure the operation of UE 120, may have the most impact on overall UE performance, and may thus have the highest priority. Upper layer signaling may include Radio Resource Control (RRC) signaling, Medium Access Control (MAC) signaling, etc. RRC signaling may include pilot measurement reports, power headroom report, etc., which may be sent on the PUSCH. Control data may be used to support data transmission at a physical layer, may impact the performance of data transmission, and may have the next highest priority. Traffic data may include user data and/or other non-control data.

TABLE 1

Priorities of Different Types of Data

| Data Type | Priority | Description |
| --- | --- | --- |
| Upper Layer Signaling | Highest Priority | Signaling for higher layers such as RRC, MAC, etc. |
| Control Data | High Priority | Control information to support data transmission at physical layer. |
| Traffic Data | Lower Priority | User data. |

In the design shown in Table 1, if UE 120 is power limited, then UE 120 may first select all upper layer signaling (if any) for transmission. UE 120 may next select as much control data as possible for transmission based on its available transmit power. UE 120 may then select as much traffic data as possible for transmission based on its available transmit power.

Different types of data may also be prioritized in other manners. In another design, control data may have the highest priority, upper layer signaling may have the next highest priority, and traffic data may have the lowest priority. For clarity, much of the description below assumes the design shown in Table 1.

UE 120 may transmit control data on the PUCCH and may transmit traffic data on the PUSCH. In this case, data for the PUCCH may have higher priority than data for the PUSCH. Both control data and traffic data may also be transmitted on the PUSCH and may have higher priority than only traffic data on the PUSCH. In one design, if there is insufficient transmit power to transmit both the PUCCH and PUSCH, then the PUCCH may be transmitted, and the PUSCH may be dropped.

Different types of control data may be transmitted in a given subframe and may be prioritized in various manners. In one design, different types of control data may be prioritized as shown in Table 2. Different types of control data may be used for different purposes and may have different impact on data transmission performance. ACK/NACK may have a large impact on performance of data transmission on the downlink and may thus be given the highest priority among different types of control data. Scheduling request may affect performance of data transmission on the uplink and may have the second highest priority. Rank indicator may indicate the number of transport blocks to transmit concurrently, and change more slowly than CQI and PMI, and may be given the third highest priority. CQI and PMI may affect the number of transmissions to send for a transport block and may be given the fourth highest priority. The different types of control data may also be considered as different data subtypes.

TABLE 2

Priorities of Different Types of Control Data

| Control Data Type | Priority (among Control Data) |
| --- | --- |
| ACK/NACK | Highest Priority |
| Scheduling Request | 2nd Highest Priority |
| Rank Indicator | 3rd Highest Priority |
| CQI | 4th Highest Priority |
| PMI | 4th Highest Priority |

In one design, UE 120 may select control data of one type at a time for transmission, starting with the control data type having the highest priority. For the priorities shown in Table 2, if UE 120 is power limited, then UE 120 may first select ACK/NACK for all carriers, then scheduling requests for all carriers, then rank indicators for all carriers, and then CQIs and PMIs for all carriers. The type of control data to select and the amount of control data of each type may be dependent on the required transmit power and the available transmit power, as described below.

In another design, control data of a given type may be further prioritized based on a scenario in which the control data is used, the manner in which the control data is transmitted, and/or other criteria. For example, control data may be prioritized as follows, from highest to lowest priority:

Multi-carrier ACK/NACK for data transmission on multiple downlink carriers.
Single-carrier ACK/NACK for data transmission on a single downlink carrier with or without MIMO,
ACK/NACK when multiplexed with CQI, PMI and RI on the uplink,
Scheduling request,
Rank indicator, and
CQI and PMI.

Different types of control data may also be prioritized in other manners. For example, scheduling requests and/or rank indicators may have higher priority than ACK/NACK. Different and/or other types of control data may also be transmitted and may be prioritized based on any suitable scheme.

Different types of traffic data may be transmitted in a given subframe and may be prioritized in various manners. In one design, different types of traffic data may be prioritized based on delay requirements as shown in Table 3. Delay sensitive traffic data (e.g., for voice, video conference, etc.) may have more stringent delay requirements and may be given the highest priority among different types of traffic data. Delay tolerant traffic data (e.g., web browsing, data download, etc.) may have less stringent delay requirements and may be given lower priority.

TABLE 3

Priorities of Different Types of Traffic Data

| Traffic Data Type | Priority (among Traffic Data) |
|---|---|
| Delay Sensitive Traffic Data | Highest Priority |
| Delay Tolerant Traffic Data | 2nd Highest Priority |

Different and/or more types of traffic data may also be defined and prioritized. Although not shown in Table 3 for simplicity, multiple subtypes or categories of delay sensitive traffic data may be supported and prioritized in a hierarchical manner. Similarly, multiple subtypes of delay tolerant traffic data may be supported and prioritized in a hierarchical manner. For simplicity, much of the description below assumes the two types of traffic data shown in Table 3.

In one design, UE 120 may select traffic data of one type at a time for transmission, starting with the traffic data type having the highest priority. For the priorities shown in Table 3, if UE 120 is power limited, then UE 120 may (i) select as much delay sensitive traffic data as possible (e.g., among the available traffic data) for transmission based on its available transmit power or (ii) determine delay sensitive traffic data that needs to be transmitted. UE 120 may then select as much delay tolerant traffic data as possible for transmission. The type of traffic data to select and the amount of traffic data of each type may be dependent on the required transmit power and the available transmit power, as described below.

Figure 5:
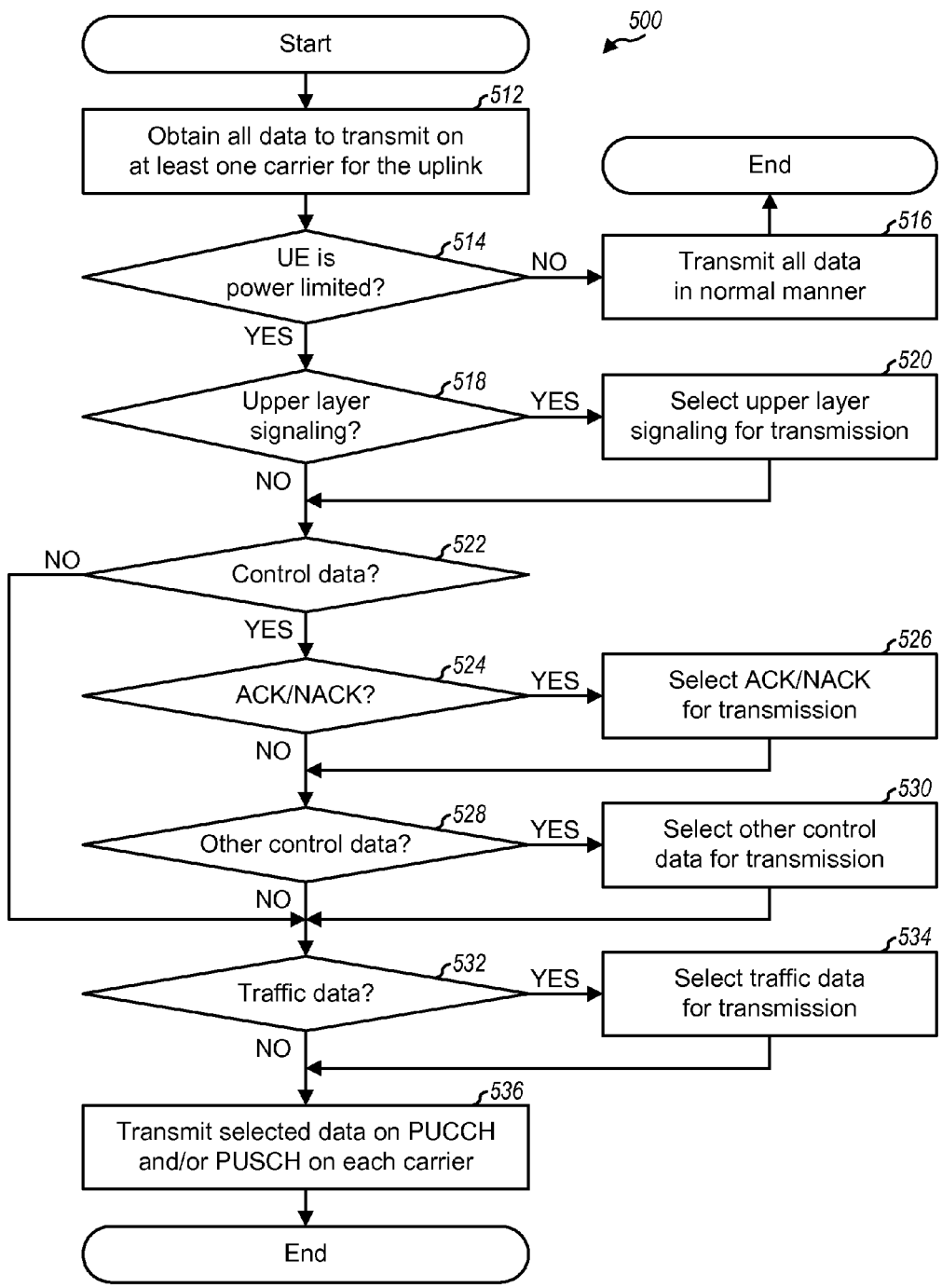
FIG. 5 shows a process for transmitting data with prioritization of data.

FIG. 5 shows a design of a process 500 for transmitting data with prioritization of data in a power-limited scenario. UE 120 may obtain all data to transmit on at least one carrier for the uplink in a given subframe (block 512). UE 120 may determine whether it is power limited (block 514). UE 120 may be power limited if the total required transmit power for all of the data to transmit exceeds the available transmit power of UE 120. If UE 120 is not power limited, then UE 120 may transmit all of the data on the at least one carrier in the normal manner (block 516). For block 516, UE 120 may transmit each type of data on each carrier at the required transmit power in order to enable reliable reception by eNB 110. UE 120 may also select one type of data at a time for transmission, starting with the highest priority data type, and may allocate the required transmit power for each type of data.

If UE 120 is power limited, as determined in block 514, then UE 120 may transmit as much data as possible based on priorities of different data types. For the design shown in Table 1, UE 120 may determine whether there is any upper layer signaling to transmit (block 518). If the answer is 'Yes' for block 518, then UE 120 may select the upper layer signaling for transmission (block 520). If the answer is 'No' for block 518 and also after block 520, UE 120 may determine whether there is any control data to transmit (block 522). If the answer is 'Yes' for block 522, then UE 120 may determine whether there is any ACK/NACK to transmit (block 524). If the answer is 'Yes' for block 524, then UE 120 may select ACK/NACK for transmission (block 526). If the answer is 'No' for block 524 and also after block 526, UE 120 may determine whether there is other control data to transmit (block 528). If the answer is 'Yes' for block 528, then UE 120 may select the other control data for transmission (block 530). If the answer is 'No' for block 522 or 528 and also after block 530, UE 120 may determine whether there is any traffic data to transmit (block 532). If the answer is 'Yes' for block 532, then UE 120 may select traffic data for transmission (block 534). If the answer is 'No' for block 532 and also after block 534, UE 120 may transmit the selected data on the PUCCH and/or PUSCH on each of the at least one carrier (block 536).

For simplicity, FIG. 5 does not show updating of the available transmit power of UE 120. UE 120 may determine the required transmit power for the selected data at each block and may update its available transmit power accordingly. For example, at block 520, UE 120 may determine the required or allocated transmit power for upper layer signaling and may subtract this transmit power from its available transmit power. At block 526, UE 120 may determine the required or allocated transmit power for ACK/NACK and may subtract this transmit power from its available transmit power. At block 530, UE 120 may determine the required or allocated transmit power for other control data and may subtract this transmit power from its available transmit power. Whether or not more data can be transmitted may be determined based on the available transmit power of UE 120 and the required transmit power of the data to transmit.

In another aspect, UE 120 may transmit data on multiple carriers by taking into account the priorities of the carriers when UE 120 is power limited. This may enable UE 120 to transmit data for higher priority carriers first and/or to use more transmit power for the higher priority carriers when UE 120 is power limited.

The multiple carriers may be assigned priorities in various manners. In one design, eNB 110 or some other network entity may assign priorities to the multiple carriers based on one or more criteria and may signaled the assigned priorities of the carriers to UE 120. For example, a higher priority may be assigned to a carrier with a better received signal quality, or a carrier with a higher modulation and coding scheme, or a carrier carrying data with higher priority (e.g., control data, or delay sensitive traffic data), or a carrier having less interference due to inter-cell interference coordination (ICIC), or a carrier with less loading, or a carrier on which more resources are assigned to UE 120 for transmission, or a carrier having other desirable characteristics. Prioritization of carriers by a network entity may be desirable for various reason, e.g., to direct UE 120 to transmit high priority data on a carrier having lower interference, higher received signal quality, lower loading, etc.

In another design, UE 120 may assign priorities to the multiple carriers based on one or more criteria and may or may not convey the assigned priorities to eNB 110. For example, UE 120 may be scheduled for uplink transmission on multiple carriers. UE 120 may select a highest priority carrier among all carriers on which UE 120 is scheduled and may transmit its high priority data (e.g., control data, or delay sensitive traffic data) on the selected carrier. In one design, UE 120 may prioritize one or possibly more carriers and may transmit high priority data on the prioritized carrier(s) when UE 120 is power limited. The remaining traffic data (if any) may rely on HARQ.

In one design, designation of a high priority carrier may be implicitly performed by UE 120. For example, a scheduler may assign resources on multiple carriers to UE 120. The assigned resources may not be tied to specific traffic flows of UE 120. The scheduler may assign the resources to UE 120 based on an algorithm that may have assumed a specific mapping of traffic flows of UE 120 to resources, e.g., a specific number of bits from each traffic flow for each resource. However, UE 120 may use the assigned resources differently than what the scheduler assumed. This may be the case, even if the same algorithm is used by both the scheduler and UE 120 to map traffic flows to resources, due to various reasons such as differences in UE buffer status at the scheduler and UE 120. UE 120 may then have a different interpretation of how to use the assigned resources for its traffic flows. If UE 120 is power limited when it receives assignments of resources on multiple carriers, then UE 120 may transmit high priority data with as much transmit power as possible, or as required, on one of the multiple carriers on which UE 120 is scheduled. UE 120 may starve (i.e., not transmit on) one or more other carriers, if needed. The carrier used by UE 120 to transmit the high priority data may effectively become a high priority carrier. The designation of the high priority carrier may thus be implicit and may have minimal impact on operation of UE 120 and other network entities.

Priorities may also be assigned to the multiple carriers in other manners. In general, priorities may be (i) explicitly assigned and made known to both eNB 110 and UE 120 or (ii) implicitly assigned and known to only UE 120 or to both eNB 110 and UE 120. Prioritizing carriers for data transmissions may be desirable to enable transmission of higher priority data on higher priority carrier.

Data may be transmitted on prioritized carriers in various manners. In a first design of transmitting data on prioritized carriers, data for one carrier at a time may be selected for transmission, starting with the highest priority carrier. In this design, the available transmit power of UE 120 may first be allocated to the highest priority carrier, then to the next highest priority carrier, etc. The number of carriers selected for data transmission may be dependent on the available transmit power of UE 120 and the required transmit power for each carrier. Transmit power may be allocated to each selected carrier in various manners.

In a first power allocation scheme, each carrier may be allocated the required transmit power for the data to transmit on that carrier, as follows:

$$\text{Allocated\_Power}(k) = \text{Required\_Power}(k), \qquad \text{Eq (1)}$$

where Required_Power(k) is the required transmit power for carrier k, and Allocated_Power(k) is the allocated transmit power for carrier k.

The first power allocation scheme may allocate as much transmit power as needed by each carrier selected for data transmission. This may ensure that data can be reliably transmitted on each selected carrier.

In a second power allocation scheme, a scaling factor may be defined for each carrier based on the priority of that carrier and/or other factors. For example, the highest priority carrier may be assigned a scaling factor of 1.0, the second highest priority carrier may be assigned a scaling factor of 0.8, etc. In general, progressively smaller scaling factors may be used for progressively lower priority carriers. In one design, a carrier may be allocated transmit power based on its scaling factor, as follows:

$$\text{Allocated\_Power}(k) = \text{Required\_Power}(k) \cdot \text{Scaling\_Factor}(k), \qquad \text{Eq (2)}$$

where Scaling_Factor(k) is a scaling factor for carrier k.

The second power allocation scheme may allocate progressively higher transmit power (e.g., relative to the required transmit power) for progressively higher priority carrier. The second power allocation scheme may allow data to be transmitted on more carriers than the first power allocation scheme.

In a second design of transmitting data on prioritized carriers, data for all carriers may be transmitted at power levels selected for these carriers. A scaling factor may be defined for each carrier based on one or more factors. Each carrier may be allocated some transmit power, as follows:

$$\text{Allocated\_Power}(k) = \frac{\text{Available\_Power}}{\text{Total\_Required\_Power}} \cdot \text{Required\_Power}(k) \cdot \text{Scaling\_Factor}(k), \qquad \text{Eq (3)}$$

where $$\text{Total\_Required\_Power} = \sum_k \text{Required\_Power}(k) \cdot \text{Scaling\_Factor}(k)$$

is the total required transmit power for all K carriers, and Available_Power is the available transmit power of UE 120.

For the second design, a portion of the available transmit power may be allocated to each carrier. Different carriers may be allocated different percentages of their required transmit power, as determined by their scaling factors. The scaling factor for each carrier may be determined based on the priority of that carrier, as described above. Alternatively or additionally, the scaling factor for each carrier may be determined based on some other characteristics of that carrier such as the type of data being transmitted on the carrier, the received signal quality for the carrier, etc.

Figure 6:
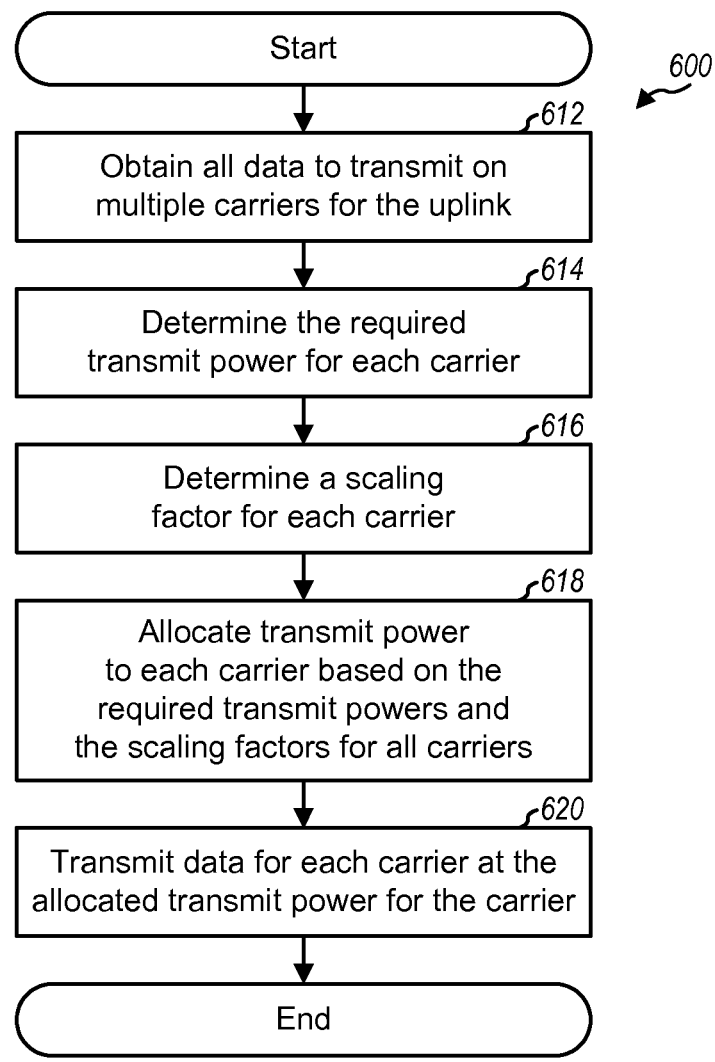
FIG. 6 shows a process for transmitting data with prioritization of carriers.

FIG. 6 shows a design of a process 600 for transmitting data on multiple carriers with prioritization of carriers in a power-limited scenario. UE 120 may obtain all data to transmit on multiple carriers for the uplink in a given subframe (block 612). UE 120 may determine the required transmit power for each carrier (block 614). In one design, each carrier may be power controlled to obtain a target received signal quality for a reference signal transmitted on that carrier by UE 120. The required transmit power for each carrier may then be determined based on the transmit power for the reference signal on the carrier and a data-to-reference power ratio for the data being transmitted on the carrier.

UE 120 may determine a scaling factor for each carrier (block 616). The scaling factor for each carrier may be dependent on the priority of the carrier, the priority of data to transmit on the carrier, and/or other factors. UE 120 may allocate transmit power to each carrier based on the required transmit powers and the scaling factors for all carriers, e.g., based on any of the designs described above (block 618). UE 120 may then transmit data for each carrier at the allocated transmit power for that carrier (block 620).

In yet another aspect, UE 120 may transmit data on multiple carriers based on the priorities of different data types as well as the priorities of the carriers when UE 120 is power limited. This may enable UE 120 to transmit higher priority data and/or data for higher priority carriers even when UE 120 is power limited.

In one design, UE 120 may prioritize different types of data, e.g., as shown in Tables 1, 2 and 3. UE 120 may then select data of one type at a time for transmission, starting with the highest priority data type. For example, UE 120 may first select upper layer signaling for all carriers, then control data for all carriers, and then traffic data for all carriers. For each data type, UE 120 may select data of one subtype at a time for transmission, starting with the highest priority data subtype. For example, for control data, UE 120 may first select ACKs/NACKs for all carriers, then scheduling requests for all carriers, then rank indicators for all carriers, and then CQIs and PMIs for all carriers. For each data type or subtype, UE 120 may prioritize across carriers for that data type or subtype.

UE 120 may allocate transmit power to data of a particular type (or subtype) across all subcarriers in various manners. In a first design, UE 120 may allocate the required transmit power for data of a given type (or subtype) for one carrier at a time, starting with the highest priority carrier, e.g., as shown in equation (1). For example, UE 120 may allocate transmit power for ACK/NACK to transmit on one carrier at a time. UE 120 may first allocate the required transmit power for ACK/NACK on the highest priority carrier, then allocate the required transmit power for ACK/NACK on the next highest priority carrier, etc. For the first design, UE 120 may essentially perform uniform power distribution across carriers, and the scaling coefficients for all carriers may be equal to one.

In a second design, UE 120 may determine an allocated transmit power for data of a given type (or subtype) for each carrier based on the required transmit power and the scaling factor for that data, e.g., as shown in equation (2) or (3). For example, UE 120 may first determine an allocated transmit power for ACK/NACK on the highest priority carrier based on a scaling factor for this carrier, then determine an allocated transmit power for ACK/NACK on the next highest priority carrier based on a scaling factor for this carrier, etc.

In one design, a single set of scaling factors may be defined for the multiple carriers, and this set of scaling factors may be used for all data types. In another design, a different set of scaling factors may be defined for the multiple carriers for each data type of interest. For example, a first set of K scaling factors may be defined for K carriers for control data, and a second set of K scaling factors may be defined for the K carriers for traffic data. Different sets of scaling factors may also be defined for different types of control data and/or different types of traffic data.

Scaling factors may be used to perform power scaling for different carriers based on the priorities of the carriers. This may be desirable if there are high priority carriers that carry delay sensitive traffic data, which may be considered as a version of quality-of-service (QoS) sensitive scheduling across carriers. In one design, a carrier may be designated as a high priority carrier, and high priority traffic data (e.g., delay sensitive traffic data) may be transmitted on this carrier due to the high priority designation. In another design, all carriers may initially have the same priority, and a carrier may become a high priority carrier if high priority data is transmitted on the carrier. The scaling factors may also be equal if all carriers have the same priority, and the transmit power for data may be scaled uniformly across carriers.

In one design, prioritization of data may have precedence over prioritization of carriers. For example, ACK/NACK for all carriers may be transmitted according to the priority of each carrier. However, ACK/NACK may be transmitted before any other type of control data, regardless of carrier priority. Since ACK/NACK has higher priority than CQI, ACK/NACK of a lower priority carrier may have precedence over CQI of a higher priority carrier. In another design, prioritization of carriers may have precedence over prioritization of data. For example, UE 120 may first select all types of data for the highest priority carrier for transmission, then select all types of data for the next highest priority carrier, etc.

Figure 7:
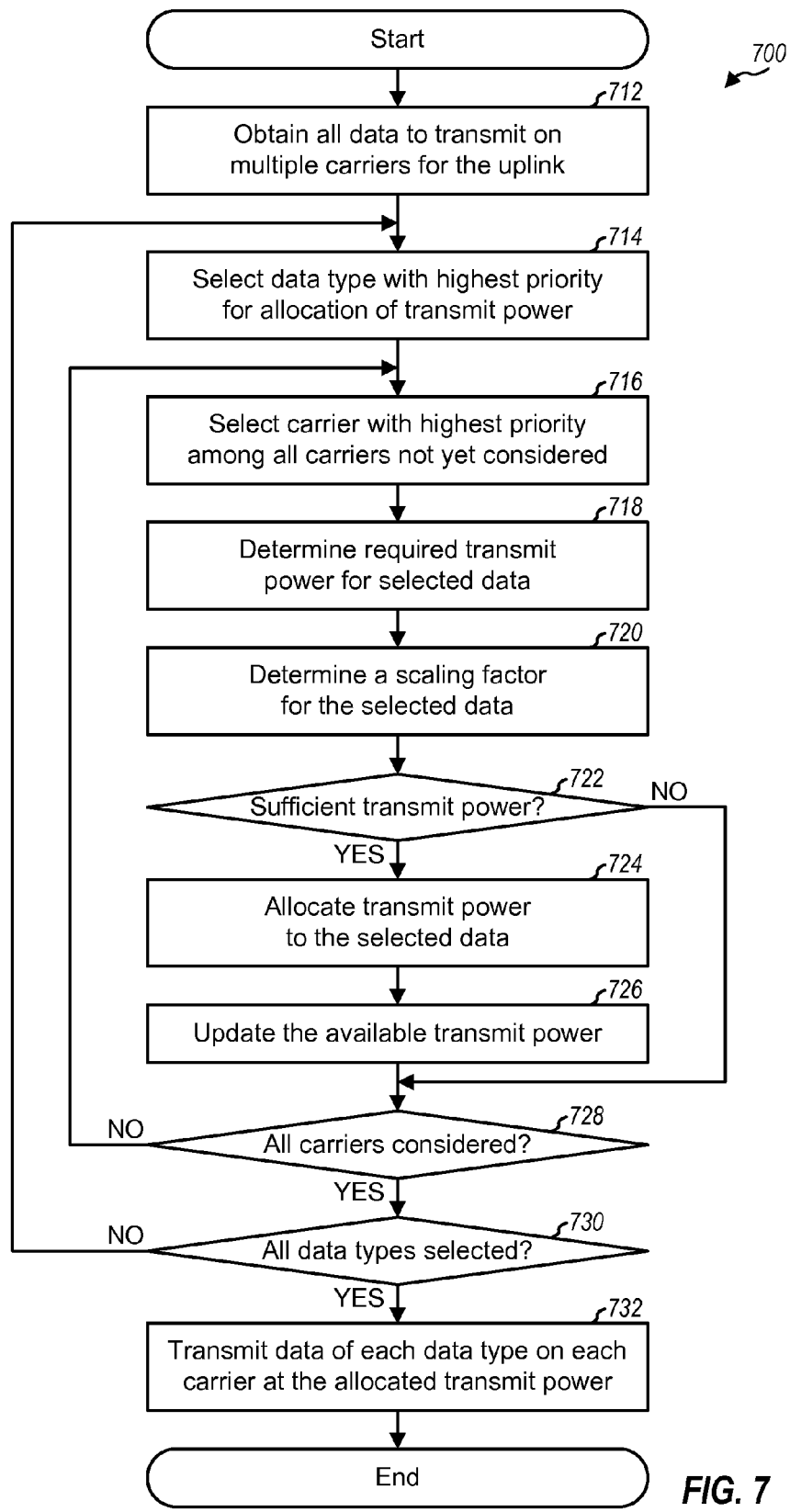
FIG. 7 shows a process for transmitting data with prioritization of data and carriers.

FIG. 7 shows a design of a process 700 for transmitting data on multiple carriers with prioritization of data and carriers in a power limited scenario. UE 120 may obtain all data to transmit on multiple carriers for the uplink in a given subframe (block 712). UE 120 may prioritize the data to transmit (e.g., based on the priorities shown in Tables 1, 2 and 3) and may select one data type at a time for allocation of transmit power. UE 120 may initially select the highest priority data type for allocation of transmit power (block 714).

For the selected data type, UE 120 may allocate transmit power to data for one carrier at a time based on the priorities of the multiple carriers. UE 120 may select the carrier with the highest priority among all carriers not yet considered (block 716). UE 120 may determine the required transmit power for the selected data, which is data of the selected data type to be transmitted on the selected carrier (block 718). UE 120 may also determine a scaling factor for the selected data (block 720). UE 120 may next determine whether there is sufficient transmit power for the selected data (block 722). If there is insufficient transmit power, then UE 120 may proceed to block 728. Otherwise, UE 120 may allocate transmit power to the selected data (block 724) and may update its available transmit power (block 726). If all carriers have not been considered, as determined in block 728, then UE 120 may return to block 716 to select the next highest priority carrier that have not been considered. Otherwise, if all carriers have been considered, then UE 120 may determine whether all data types have been selected (block 730). If the answer is 'No', then UE 120 may return to block 714 to select the next highest priority data type for allocation of transmit power. Once all data types have been considered, as determined in block 730, UE 120 may transmit the data of each data type on each carrier at the allocated transmit power for the data (block 732).

FIG. 7 shows an exemplary design of a process to transmit data on multiple carriers with priorities for data and carriers. The design in FIG. 7 may consider all data of a given priority/data type across all carriers before moving to data of a lower priority. Data may also be transmitted on multiple carriers in other manners. In general, transmit power may be allocated to data on different carriers in any order, which may be selected based on any set of criteria.

FIG. 8 shows a design of a process 800 for transmitting data in a wireless system. Process 800 may be performed by a UE (as described below) or by some other entity. The UE may obtain data to transmit on at least one carrier for the uplink (block 812). The UE may determine that it is power limited for transmission on the at least one carrier (block 814). The UE may prioritize the data to transmit based on at least one criterion in response to it being power limited (block 816). The UE may allocate its available transmit power to the prioritized data (block 818). The UE may then transmit the prioritized data at the allocated transmit power (block 820).

In one design of block 814, the UE may determine the total required transmit power for the data to transmit. The UE may then determine that it is power limited based on the total required transmit power exceeding the available transmit power of the UE. The UE may also determine that it is power limited in other manners.

For block 816, the UE may prioritize the data to transmit in various manners. The at least one criterion for prioritizing the data to transmit may comprise channel type, or data type, or control data type, or traffic data type, or carrier priority, or signaling type, or some other criteria, or a combination thereof. In one design, the UE may prioritize the data to transmit based on data type, with control data having higher priority than traffic data. Control data multiplexed with traffic data may have higher priority than traffic data. In another design, the UE may prioritize the data to transmit based on control data type, with ACK/NACK having higher priority than CQI, or scheduling request, or rank indicator, or PMI, or a combination thereof. In yet another design, the UE may prioritize the data to transmit based on traffic data type, with delay sensitive traffic data having higher priority than delay tolerant traffic data. In yet another design, the UE may prioritize the data to transmit based on channel type, with data for a control channel (e.g., PUCCH) having higher priority than data for a data channel (e.g., PUSCH). In yet another design, the UE may prioritize the data to transmit based on signaling type, with data for upper layer signaling having higher priority than data for physical layer. The upper layer signaling may comprise RRC signaling, or MAC signaling, and/or some other upper layer signaling. The UE may prioritize the data to transmit based on other criteria and/or in other manners.

In one design of block 818, the UE may allocate its available transmit power to the data to transmit, one data type at a time, starting with the highest priority data type, e.g., as shown in FIG. 5. In another design, the UE may allocate transmit power to data of each data type based on the required transmit power for the data and a scaling factor for the data type. Progressively higher priority data type may be assigned progressively larger scaling factor.

In one design, a plurality of carriers may be available for the uplink. In one design, one carrier among the plurality of carriers may be designated to carry control data (or UCI) on the uplink. The designated carrier may have the highest priority among the plurality of carriers. Traffic data may be sent on the designated carrier (with or without control data) and/or on other carriers. In another design, control data may be sent on any one of the plurality of carriers. For both designs, the UE may obtain data to transmit on one or multiple carriers, and the data to transmit may be prioritized based on the priorities of the plurality of carriers.

In one design, the UE may obtain data to transmit on a plurality of carriers in block 812. In one design of block 816 for multi-carrier operation, the UE may prioritize the data to transmit on the plurality of carriers based on the priorities of the plurality of carriers, with data for a higher priority carrier having higher priority than data for a lower priority carrier. The priorities of the carriers may be determined based on a received signal quality for each carrier, or a modulation and coding scheme for each carrier, or priority of data to transmit on each carrier, or expected interference on each carrier, or loading on each carrier, or amount of assigned resources on each carrier, or some other characteristic, or a combination thereof. A carrier with both control data and traffic data may have higher priority than a carrier with only traffic data.

In another design of block 816 for multi-carrier operation, the UE may prioritize the data to transmit based on the priorities of the plurality of carriers and the priorities of different data types. In one design, the UE may (i) prioritize the data to transmit based on the priorities of the plurality of data types and (ii) prioritize the data of each data type based on the priorities of the carriers. In another design, the UE may (i) prioritize the data to transmit based on the priorities of the carriers and (ii) prioritize the data for each carrier based on the priorities of the different data types. The UE may also prioritize the data to transmit in other manners. For both designs, the UE may prioritize different types of data for each carrier as shown in Tables 1 to 3.

In one design of block 818 for multi-carrier operation, the UE may allocate its available transmit power to the plurality of carriers, one carrier at a time, starting with the highest priority carrier. In another design, the UE may allocate transmit power to data for each carrier based on the required transmit power for the data and a scaling factor for the carrier. Progressively higher priority carrier may be assigned progressively larger scaling factor. In yet another design, the UE may allocate its available transmit power to the data to transmit based on the priorities of different data types and the priorities of the plurality of carriers. In one design, the UE may allocate its available transmit power to the data to transmit, one data type at a time, starting with the highest priority data type. For each data type, the UE may allocate its available transmit power to the data of that data type based on the priorities of the carriers.

For multi-carrier operation, the UE may allocate transmit power to data for each carrier based on the required transmit power for the data, e.g., as shown in equation (1). The UE may also allocate transmit power to the data for each carrier based further on a scaling factor for the carrier, e.g., as shown in equation (2). The UE may allocate transmit power to the data for each carrier based further on the total required transmit power for all of the data to transmit and/or the available transmit power, e.g., as shown in equation (3). The scaling factor for each carrier may be determined based on the priority of the carrier, or the data to transmit on the carrier, or some other criteria, or a combination thereof.

In one design, the UE may receive signaling conveying the priorities of the carriers. In another design, the UE may determine the priorities of the carriers. For example, the UE may select one of the plurality of carriers to transmit high priority data, and the selected carrier may be (explicitly or implicitly) designated as a high priority carrier.

FIG. 9 shows a design of an apparatus 900 for transmitting data in a wireless communication system. Apparatus 900 includes a module 912 to obtain data to transmit on at least one carrier for the uplink at a UE, a module 914 to determine that the UE is power limited for transmission on the at least one carrier, a module 916 to prioritize the data to transmit based on at least one criterion in response to the UE being power limited, a module 918 to allocate available transmit power of the UE to the prioritized data, and a module 920 to transmit the prioritized data at the allocated transmit power.

Figures 10, 11:
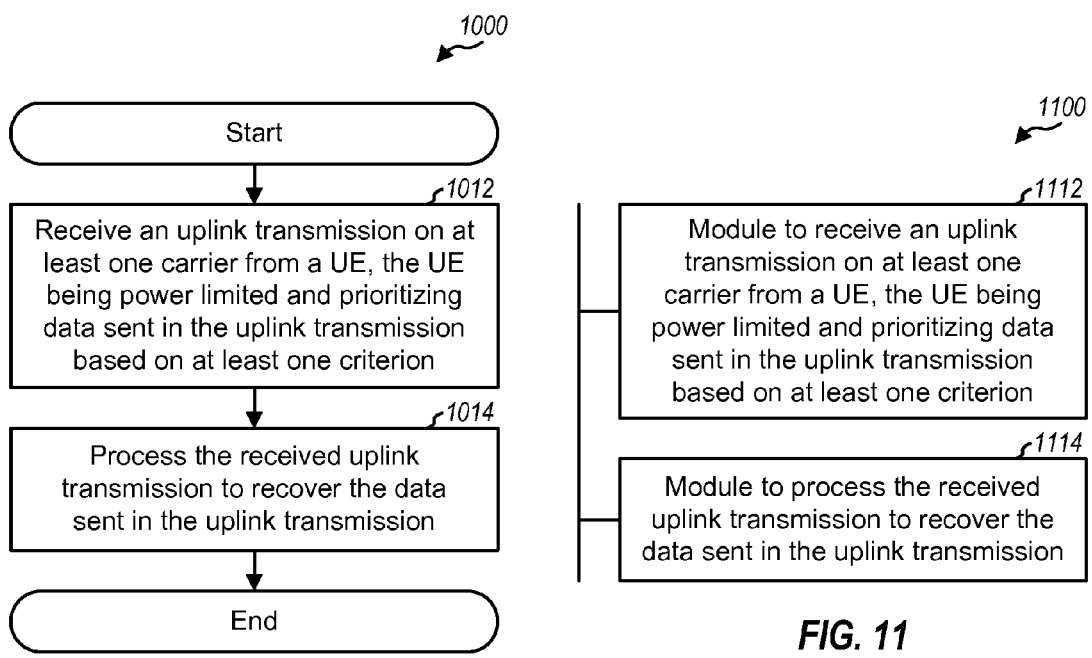
FIG. 10 shows a process for receiving data in a wireless system.
FIG. 11 shows an apparatus for receiving data in a wireless system.

FIG. 10 shows a design of a process 1100 for transmitting data in a wireless system. Process 1000 may be performed by a base station/eNB (as described below) or by some other entity. The base station may receive an uplink transmission on at least one carrier from a UE (block 1012). The UE may be power limited and may prioritize data sent in the uplink transmission based on at least one criterion. The base station may process the received uplink transmission to recover the data sent in the uplink transmission (block 1014).

The data sent in the uplink transmission may be prioritized in various manners. In one design, the data sent in the uplink transmission may comprise data of a plurality of data types and may be prioritized based on the priorities of the different data types. The uplink transmission may be sent on a plurality of carriers. In one design, for multi-carrier operation, the data sent in the uplink transmission may be prioritized based on the priorities of the carriers. In another design, the data sent in the uplink transmission may be prioritized based on the priorities of different data types. In yet another design, the data of each data type may be prioritized based on the priorities of the carriers. The data sent in the uplink transmission may also be prioritized in other manners. The base station may send signaling conveying the priorities of the carriers. Alternatively, the UE may determine the priorities of the carriers.

The base station may adjust transmit power of the UE (e.g., for a reference signal) on each carrier to obtain a target received signal quality for the UE on that carrier. The UE may transmit data on each carrier at transmit power determined based on the adjusted transmit power (e.g., for the reference signal).

FIG. 11 shows a design of an apparatus 1100 for receiving data in a wireless communication system. Apparatus 1100 includes a module 1112 to receive an uplink transmission on at least one carrier from a UE, the UE being power limited and prioritizing data sent in the uplink transmission based on at least one criterion, and a module 1114 to process the received uplink transmission to recover the data sent in the uplink transmission.

The modules in FIGS. 9 and 11 may comprise processors, electronic devices, hardware devices, electronic components, logical circuits, memories, software codes, firmware codes, etc., or any combination thereof.

Figure 12:
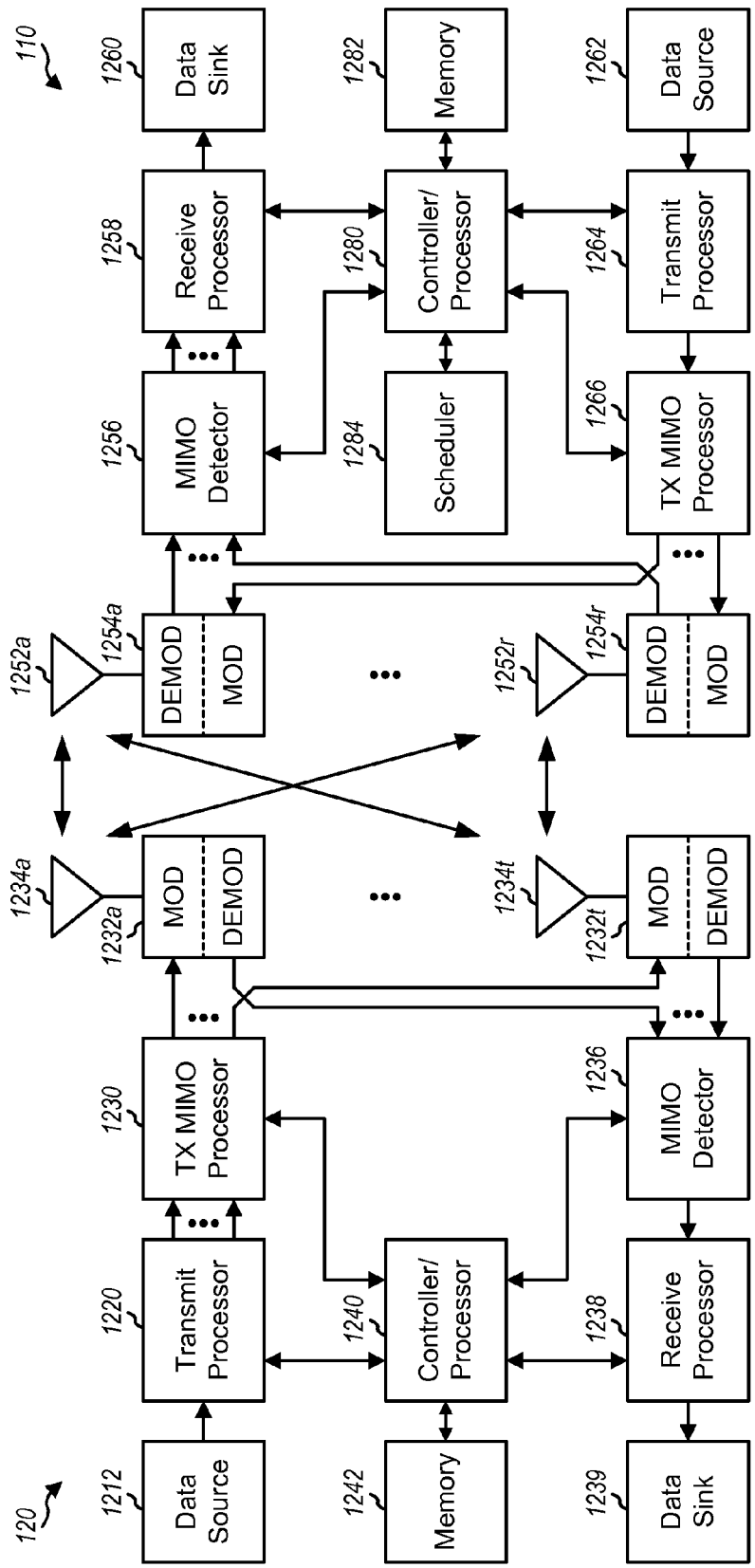
FIG. 12 shows a block diagram of a base station and a UE.

FIG. 12 shows a block diagram of a design of base station/eNB 110 and UE 120 in FIG. 1. UE 120 may be equipped with T antennas 1234a through 1234t, and eNB 110 may be equipped with R antennas 1252a through 1252r, where in general T≥1 and R≥1.

At UE 120, a transmit processor 1220 may receive traffic data from a data source 1212, process (e.g., encode and modulate) the traffic data based on one or more modulation and coding schemes, and provide data symbols. Transmit processor 1220 may also process control data/UCI (e.g., ACK/NACK, CQI, scheduling request, RI, PMI, etc.) from a controller/processor 1240 and provide control symbols. Transmit processor 1220 may also generate reference symbols for a reference signal or pilot. A transmit (TX) MIMO processor 1230 may perform spatial processing (e.g., precoding) on the data symbols, the control symbols, and/or the reference symbols from transmit processor 1220, if applicable, and may provide T output symbol streams to T modulators (MODs) 1232a through 1232t. Each modulator 1232 may process a respective output symbol stream (e.g., for SC-FDMA, OFDM, etc.) to obtain an output sample stream. Each modulator 1232 may further process (e.g., convert to analog, amplify, filter, and upconvert) the output sample stream to obtain an uplink signal. T uplink signals from modulators 1232a through 1232t may be transmitted via T antennas 1234a through 1234t, respectively.

At eNB 110, antennas 1252a through 1252r may receive the uplink signals from UE 120 and provide received signals to demodulators (DEMODs) 1254a through 1254r, respectively. Each demodulator 1254 may condition (e.g., filter, amplify, downconvert, and digitize) a respective received signal to obtain received samples. Each demodulator 1254 may further process the received samples (e.g., for SC-FDMA, OFDM, etc.) to obtain received symbols. A MIMO detector 1256 may obtain received symbols from all R demodulators 1254a through 1254r, perform MIMO detection on the received symbols if applicable, and provide detected symbols. A receive processor 1258 may process (e.g., demodulate and decode) the detected symbols, provide decoded traffic data to a data sink 1260, and provide decoded control data to a controller/processor 1280.

On the downlink, at eNB 110, traffic data from a data source 1262 and control data (e.g., grants) from controller/processor 1280 may be processed by a transmit processor 1264, precoded by a TX MIMO processor 1266 if applicable, conditioned by modulators 1254a through 1254r, and transmitted to UE 120. At UE 120, the downlink signals from eNB 110 may be received by antennas 1234, conditioned by demodulators 1232, processed by a MIMO detector 1236 if applicable, and further processed by a receive processor 1238 to obtain the traffic data and control data transmitted to UE 120. Processor 1238 may provide the decoded traffic data to a data sink 1239 and the decoded control data to processor 1240.

Controllers/processors 1240 and 1280 may direct the operation at UE 120 and eNB 110, respectively. Processor 1240 and/or other processors and modules at UE 120 may perform or direct process 500 in FIG. 5, process 600 in FIG. 6, process 700 in FIG. 7, process 800 in FIG. 8, and/or other processes for the techniques described herein. Processor 1280 and/or other processors and modules at eNB 110 may perform or direct process 1000 in FIG. 10 and/or other processes for the techniques described herein. Memories 1242 and 1282 may store data and program codes for UE 120 and eNB 110, respectively. A scheduler 1284 may schedule UEs for downlink and/or uplink transmission and may provide resource assignments for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    obtaining data to transmit on a plurality of carriers for uplink at a user equipment (UE);
    determining that the UE is power limited for transmission on the plurality of carriers, wherein the determining that the UE is power limited comprises determining total required transmit power for the data to transmit, and determining that the UE is power limited based on the total required transmit power exceeding available transmit power of the UE;
    prioritizing the data to transmit based on at least one criterion in response to the UE being power limited, wherein the prioritizing the data to transmit comprises prioritizing the data to transmit based on data type;
    allocating transmit power to control data based on required transmit power for the control data; and
    allocating available transmit power to traffic data after allocating the required transmit power to the control data, wherein the allocating the available transmit power comprises allocating the available transmit power to the traffic data for each of the plurality of carriers based on a scaling factor for each carrier.

2. The method of claim 1, wherein the at least one criterion comprises channel type, or control data type, or traffic data type, or carrier priority, or signaling type, or a combination thereof.

3. The method of claim 1, wherein the prioritizing the data to transmit comprises prioritizing the data to transmit based on control data type, with acknowledgement/negative acknowledgement (ACK/NACK) having higher priority than channel quality indicator (CQI), or scheduling request, or rank indicator (RI), or precoding matrix indicator (PMI), or a combination thereof.

4. The method of claim 1, wherein the prioritizing the data to transmit comprises prioritizing the data to transmit based on traffic data type, with delay sensitive traffic data having higher priority than delay tolerant traffic data.

5. The method of claim 1, wherein the prioritizing the data to transmit comprises prioritizing the data to transmit based on channel type, with data for a control channel having higher priority than data for a data channel.

6. The method of claim 1, wherein the prioritizing the data to transmit comprises prioritizing the data to transmit based on signaling type, with data for upper layer signaling having higher priority than data for physical layer.

7. The method of claim 6, wherein the upper layer signaling comprises Radio Resource Control (RRC) signaling, or Medium Access Control (MAC) signaling, or both.

8. The method of claim 1, wherein the data to transmit comprises data of a plurality of data types, the method further comprising:
   allocating available transmit power to the data to transmit, one data type at a time, starting with a highest priority data type.

9. The method of claim 1, wherein the plurality of carriers are available for the uplink, and wherein one carrier among the plurality of carriers is designated to carry the control data on the uplink.

10. The method of claim 9, wherein the data to transmit is prioritized based on priorities of the plurality of carriers, and wherein the carrier designated to carry the control data on the uplink has a highest priority among the plurality of carriers.

11. The method of claim 1, wherein the prioritizing the data transmit comprises prioritizing the data to transmit based on priorities of the plurality of carriers, with data for a higher priority carrier having higher priority than data for a lower priority carrier.

12. The method of claim 11, wherein the priorities of the plurality of carriers are determined based on a received signal quality for each carrier, or a modulation and coding scheme for each carrier, or priority of data to transmit on each carrier, or expected interference on each carrier, or loading on each carrier, or amount of assigned resources on each carrier, or a combination thereof.

13. The method of claim 11, further comprising:
   allocating available transmit power to the plurality of carriers, one carrier at a time, starting with a highest priority carrier.

14. The method of claim 11, further comprising:
   receiving signaling conveying the priorities of the plurality of carriers.

15. The method of claim 11, further comprising:
   selecting one of the plurality of carriers to transmit high priority data, the selected carrier being designated as a high priority carrier.

16. The method of claim 1, wherein the data to transmit comprises data of a plurality of data types.

17. The method of claim 16, wherein the prioritizing the data to transmit comprises
   prioritizing the data to transmit based on priorities of the plurality of data types, and
   prioritizing data of each data type based on priorities of the plurality of carriers.

18. The method of claim 16, wherein the prioritizing the data to transmit comprises
   prioritizing the data to transmit based on priorities of the plurality of carriers, and
   prioritizing data for each carrier based on priorities of the plurality of data types.

19. The method of claim 16, further comprising:
   allocating available transmit power to the data to transmit based on priorities of the plurality of data types and priorities of the plurality of carriers.

20. The method of claim 16, further comprising:
   allocating available transmit power to the data to transmit, one data type at a time, starting with a highest priority data type; and
   allocating the available transmit power to the data of each data type based on priorities of the plurality of carriers.

21. The method of claim 1, further comprising:
   allocating transmit power to data for each carrier based on required transmit power for the data.

22. The method of claim 21, wherein the allocating transmit power comprises allocating transmit power to the data for each carrier based further on a scaling factor for the carrier.

23. The method of claim 22, wherein the scaling factor for each carrier is determined based on priority of the carrier, or data type of the data to transmit on the carrier, or priority of the data to transmit on the carrier, or a combination thereof.

24. The method of claim 21, wherein the allocating transmit power comprises allocating transmit power to the data for each carrier based further on total required transmit power for the data to transmit on the plurality of carriers, or available transmit power of the UE, or both.

25. The method of claim 1, further including:
   determining that the UE is not power limited; and
   transmitting all of the data to transmit at the required transmit power in response to the determining that the UE is not power limited.

26. An apparatus for wireless communication, comprising:
   means for obtaining data to transmit on a plurality of carriers for uplink at a user equipment (UE);
   means for determining that the UE is power limited for transmission on the plurality of carriers, wherein the determining that the UE is power limited comprises determining total required transmit power for the data to transmit, and determining that the UE is power limited based on the total required transmit power exceeding available transmit power of the UE; and
   means for prioritizing the data to transmit based on at least one criterion in response to the UE being power limited, wherein the means for prioritizing the data to transmit comprises means for prioritizing the data to transmit based on data type;
   means for allocating transmit power to control data based on required transmit power for the control data; and
   means for allocating available transmit power to traffic data after allocating the required transmit power to the control data, wherein the means for allocating the available transmit power comprises means for allocating the available transmit power to the traffic data for each of the plurality of carriers based on a scaling factor for each carrier.

27. The apparatus of claim 26, wherein the data to transmit comprises data of a plurality of data types, the apparatus further comprising:
   means for allocating available transmit power to the data to transmit, one data type at a time, starting with a highest priority data type.

28. The apparatus of claim 26, wherein the means for prioritizing the data to transmit comprises means for prioritizing the data to transmit based on priorities of the plurality of carriers, with data for a higher priority carrier having higher priority than data for a lower priority carrier.

29. The apparatus of claim 26, wherein the data to transmit comprises data of a plurality of data types, the apparatus further comprising:
   means for allocating available transmit power to the data to transmit based on priorities of the plurality of data types and priorities of the plurality of carriers.

30. The apparatus of claim 26, comprising:
   means for allocating transmit power to data for each carrier based on required transmit power for the data and a scaling factor for the carrier.

31. The apparatus of claim 26, wherein the means for determining that the UE is power limited comprises:

means for determining total required transmit power for the data to transmit; and means for determining that the UE is power limited based on the total required transmit power exceeding available transmit power of the UE.

32. The apparatus of claim 26, further comprising:
means for determining that the UE is not power limited; and
means for transmitting all of the data to transmit at the required transmit power in response to determining that the UE is not power limited.

33. An apparatus for wireless communication, comprising:
a memory,
at least one processor coupled to the memory, where the memory comprises executable instructions to cause the processor to:
obtain data to transmit on a plurality of carriers for uplink at a user equipment (UE),
determine that the UE is power limited for transmission on the plurality of carriers, wherein the determining that the UE is power limited comprises determining total required transmit power for the data to transmit, and determining that the UE is power limited based on the total required transmit power exceeding available transmit power of the UE,
prioritize the data to transmit based on at least one criterion in response to the UE being power limited, wherein the at least one processor is configured to prioritize the data to transmit based on data type,
allocate transmit power to control data based on required transmit power for the control data, and
allocate available transmit power to traffic data after allocating the required transmit power to the control data, wherein the at least one processor is configured to allocate the available transmit power to the traffic data for each of the plurality of carriers based on a scaling factor for each carrier.

34. The apparatus of claim 33, wherein the data to transmit comprises data of a plurality of data types, and wherein the at least one processor is configured to allocate available transmit power to the data to transmit, one data type at a time, starting with a highest priority data type.

35. The apparatus of claim 33, wherein the at least one processor is configured to prioritize the data to transmit based on priorities of the plurality of carriers, with data for a higher priority carrier having higher priority than data for a lower priority carrier.

36. The apparatus of claim 33, wherein the data to transmit comprises data of a plurality of data types, and wherein the at least one processor is configured to allocate available transmit power to the data to transmit based on priorities of the plurality of data types and priorities of the plurality of carriers.

37. The apparatus of claim 33, wherein the at least one processor is configured to allocate transmit power to data for each carrier based on required transmit power for the data and a scaling factor for the carrier.

38. The apparatus of claim 33, wherein the at least one processor is further configured to determine that the UE is power limited by determining total required transmit power for the data to transmit, and determining that the UE is power limited based on the total required transmit power exceeding available transmit power of the UE.

39. The apparatus of claim 33, wherein the at least one processor is further configured to determine that the UE is not power limited, and to transmit all of the data to transmit at the required transmit power in response to determining that the UE is not power limited.

40. A non-transitory computer-readable medium comprising:
code for causing at least one computer to obtain data to transmit on a plurality of carriers for uplink at a user equipment (UE),
code for causing the at least one computer to determine that the UE is power limited for transmission on the plurality of carriers, wherein the determining that the UE is power limited comprises determining total required transmit power for the data to transmit, and determining that the UE is power limited based on the total required transmit power exceeding available transmit power of the UE,
code for causing the at least one computer to prioritize the data to transmit based on at least one criterion in response to the UE being power limited, wherein the code for causing the at least one computer to prioritize the data to transmit comprises code for causing the at least one computer to prioritize the data to transmit based on data type,
code for causing the at least one computer to allocate transmit power to control data based on required transmit power for the control data, and code for causing the at least one computer to allocate available transmit power to traffic data after allocating the required transmit power to the control data, wherein the code for causing the at least one computer to allocate the available transmit power comprises code for causing the at least one computer to allocate the available transmit power to the traffic data for each of the plurality of carriers based on a scaling factor for each carrier.

41. The computer-readable medium of claim 40, wherein the code for causing the at least one computer to determine that the UE is power limited includes code for causing the at least one computer to determine that the UE is power limited by determining total required transmit power for the data to transmit and determining that the UE is power limited based on the total required transmit power exceeding available transmit power of the UE.

42. The computer-readable medium of claim 40 further including:
code for causing the at least one computer to determine that the UE is not power limited; and
code for causing the at least one computer to transmit all of the data to transmit at the required transmit power in response to determining that the UE is not power limited.

43. A method for wireless communication, comprising:
receiving an uplink transmission on a plurality of carriers from a user equipment (UE), the UE being power limited and prioritizing data sent in the uplink transmission based on at least one criterion in response to the UE being power limited, wherein the UE being power limited is based on the total required transmit power for the data to transmit exceeding available transmit power of the UE; and further based on priorities of the plurality of data types, wherein the receiving comprises receiving control data with transmit power allocated based on required transmit power for the control data, and traffic data with available transmit power allocated after allocation of the required transmit power to the control data for each of the plurality of carriers based on a scaling factor for each carrier; and
processing the received uplink transmission to recover the data sent in the uplink transmission.

44. The method of claim 43, wherein data of each data type is prioritized based on priorities of the plurality of carriers.

45. The method of claim 43, wherein the data sent in the uplink transmission is prioritized based on priorities of the plurality of carriers.

46. The method of claim 45, further comprising:
adjusting transmit power of the UE on each of the plurality of carriers to obtain a target received signal quality for the UE on the carrier.

47. The method of claim 45, further comprising:
sending signaling conveying the priorities of the plurality of carriers.

48. The method of claim 43, wherein the UE is adapted to determine that the UE is power limited by determining total required transmit power for data to transmit, and to determine that the UE is power limited based on the total required transmit power exceeding available transmit power of the UE.

49. The method of claim 43, wherein the UE is adapted to determine that the UE is not power limited, and to transmit all of the data to transmit at the required transmit power in response to determining that the UE is not power limited.

50. An apparatus for wireless communication, comprising:
means for receiving an uplink transmission on a plurality of carriers from a user equipment (UE), the UE being power limited and prioritizing data sent in the uplink transmission based on at least one criterion in response to the UE being power limited, data to transmit exceeding available transmit power of the UE, and further based on priorities of the plurality of data types, wherein the means for receiving comprises means for receiving control data with transmit power allocated based on required transmit power for the control data, and traffic data with available transmit power allocated after allocation of the required transmit power to the control data for each of the plurality of carriers based on a scaling factor for each carrier; and
means for processing the received uplink transmission to recover the data sent in the uplink transmission.

51. The apparatus of claim 50, wherein the data sent in the uplink transmission is prioritized based on priorities of the plurality of carriers.

52. The apparatus of claim 46, wherein the UE is adapted to determine that the UE is power limited by determining total required transmit power for data to transmit, and to determine that the UE is power limited based on the total required transmit power exceeding available transmit power of the UE.

53. The apparatus of claim 52, wherein the UE is adapted to determine that the UE is not power limited, and to transmit all of the data to transmit at the required transmit power in response to determining that the UE is not power limited.

* * * * *